US010062287B2

(12) United States Patent
Casson et al.

(10) Patent No.: US 10,062,287 B2
(45) Date of Patent: Aug. 28, 2018

(54) CONTENTION AVOIDANCE

(71) Applicant: Modular Mining Systems, Inc., Tucson, AZ (US)

(72) Inventors: William Casson, Tucson, AZ (US); Lucas Van Latum, Tucson, AZ (US); Michael Lewis, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 32 days.

(21) Appl. No.: 15/256,326

(22) Filed: Sep. 2, 2016

(65) Prior Publication Data

US 2016/0371979 A1 Dec. 22, 2016

Related U.S. Application Data

(63) Continuation of application No. 14/659,470, filed on Mar. 16, 2015, now Pat. No. 9,441,971, which is a continuation of application No. 13/853,934, filed on Mar. 29, 2013, now Pat. No. 9,046,371.

(51) Int. Cl.
| | |
|---|---|
| *G01C 21/00* | (2006.01) |
| *G08G 1/16* | (2006.01) |
| *G05D 1/02* | (2006.01) |
| *G01C 21/20* | (2006.01) |
| *G01C 21/28* | (2006.01) |
| *G08G 1/0968* | (2006.01) |
| *G08G 1/00* | (2006.01) |

(52) U.S. Cl.
CPC ............. *G08G 1/164* (2013.01); *G01C 21/00* (2013.01); *G01C 21/20* (2013.01); *G01C 21/28* (2013.01); *G05D 1/0217* (2013.01); *G05D 1/0287* (2013.01); *G08G 1/0968* (2013.01); *G08G 1/205* (2013.01); *B60W 2550/14* (2013.01); *G05B 2219/45004* (2013.01); *G05D 2201/021* (2013.01); *G08G 1/20* (2013.01)

(58) Field of Classification Search
CPC ...... G08G 1/164; G08G 1/0968; G08G 1/205; G08G 1/20; G01C 21/00; G01C 21/20; G01C 21/28; G05D 1/0217; G05D 1/0287; B60W 2550/14; G05B 2201/021
USPC ........................................................ 701/537
See application file for complete search history.

(56) References Cited

U.S. PATENT DOCUMENTS 5,156,230 A * 10/1992 Washburn ................. B60P 3/42
180/170
5,406,483 A * 4/1995 Kallis .................. B60R 16/0315
192/3.3

(Continued)

*Primary Examiner* — Gertrude Arthur Jeanglaude
(74) *Attorney, Agent, or Firm* — Quarles & Brady LLP

(57) ABSTRACT

A system and method for navigating a vehicle through a mining environment to a target destination is presented. The system and method may be utilized to avoid contention in the mining environment. A route through the mining environment to the target destination for the vehicle is identified and a first speed profile for at least a portion of the route is determined. A potential contention condition associated with the route is identified and the potential contention condition along the route is used to determine a second speed profile for at least a portion of the route. An optimized speed profile is determined using the first speed profile and the second speed profile, and at least a portion of the optimized speed profile is communicated to the vehicle.

20 Claims, 9 Drawing Sheets

(56) References Cited

U.S. PATENT DOCUMENTS

| | | | | |
|---|---|---|---|---|
| 6,178,374 | B1* | 1/2001 | Mohlenkamp | G08G 1/096716 340/905 |
| 6,898,503 | B2* | 5/2005 | Makela | G01C 21/12 701/50 |
| 8,090,491 | B2* | 1/2012 | Barfoot | G08G 1/20 180/116 |
| 8,260,483 | B2* | 9/2012 | Barfoot | G08G 1/20 180/116 |
| 8,694,193 | B2* | 4/2014 | Makela | E21F 13/025 701/25 |
| 9,046,371 | B2* | 6/2015 | Casson | G01C 21/00 |
| 9,441,971 | B2* | 9/2016 | Casson | G01C 21/00 |
| 2005/0065711 | A1* | 3/2005 | Dahlgren | G07C 5/008 701/117 |
| 2009/0043439 | A1* | 2/2009 | Barfoot | G08G 1/20 701/25 |
| 2011/0118900 | A1* | 5/2011 | Uchida | G05D 1/0297 701/2 |
| 2012/0035798 | A1* | 2/2012 | Barfoot | G08G 1/20 701/25 |
| 2012/0197504 | A1* | 8/2012 | Sujan | G01C 21/3469 701/70 |

* cited by examiner

CONTENTION AVOIDANCE

CROSS-REFERENCE TO RELATED APPLICATIONS

This application is a continuation of U.S. patent application Ser. No. 14/659,470 entitled "CONTENTION AVOIDANCE" filed on Mar. 16, 2015, which is a continuation of U.S. patent application Ser. No. 13/853,934 entitled "CONTENTION AVOIDANCE" filed on Mar. 29, 2013.

FIELD OF THE INVENTION

This disclosure is related to systems and methods for providing contention avoidance within a mining environment, and specifically, to a system and method for analyzing movement of mobile equipment within a mining environment to identify and reduce occurrences of contention.

BACKGROUND OF THE INVENTION

Mining environments, particularly open pit surface mining environments, present unique challenges to maintaining safe and efficient operation of vehicles. The workhorse of a modern surface mine is a mine haul truck, which is a dump truck capable of hauling hundreds of tons of material. Haul trucks are some of the largest land vehicles ever built. As such, they are characterized by limited maneuverability, relatively slow acceleration and deceleration, poor sight lines on every side of the vehicle, and relatively low fuel efficiency. Other vehicles, such as shovels, dozers, bucket wheel excavators, and other equipment are each similarly difficult to control. The vehicles are large, with wide turning radii, and slow braking and accelerating capabilities.

At any one time, a large number of vehicles may be working within a particular mine. During operation, each vehicle will move to different locations within the mine to retrieve material, dump material, or to assist in a number of different operations. While navigating between the different locations, each vehicle will travel along a particular route following one or more of the mine's roadways or designated throughways. In some cases, a centralized control system is arranged to assign each vehicle to a particular route through the mine.

Because a large number of vehicles may be operating in the mine simultaneously, the likelihood of a first vehicle interfering with the movement of a second vehicle (or occupying a resource desired by the second vehicle) is relatively high. This is referred to as contention, and is usually managed by the provision of traffic control systems located at the mine's intersections, single lane roadways, dump sites, bridges, or other locations where traffic must be managed. Example traffic control systems include stop signs, traffic lights, rights of way, one-way restrictions, and speed limits.

Contention between mobile equipment in open pit and underground mines can be a significant source of losses in machine productivity, increases in fuel consumption, and increased maintenance costs. When a vehicle encounters a location with potential contention the vehicle may need to slow down. In most cases, though, the vehicle is forced to stop and wait for an opportunity when it is safe and procedure dictates that the vehicle can proceed. The delays can be extended when there are multiple vehicles or pieces of equipment at the point of potential contention.

Large mining vehicles are very slow to accelerate. As a result, the cost of bringing equipment to a complete stop, even for a few seconds, is very high. For example, from a dead stop an empty truck on a flat grade may take 45 seconds or more to reach nominal speed. The situation is worse for equipment going uphill, loaded, or uphill loaded.

One situation where contention is most detrimental involves a loaded haul truck that is stopped on a positive grade. In that scenario the loaded truck will have to depend on the truck's brakes to hold the truck still on the ramp. When it is safe to move, the truck will be forced to use the truck's engine at full power in order to get the truck moving again. This consumes fuel at a rapid rate and puts stress on mechanical and electrical components of the truck.

The cost of contention can, therefore, be significant. Because mining haulage vehicles have exceptionally high Gross Vehicle Mass (e.g., greater than 500 tons), the costs associated with accelerating and stopping a truck can be very high. It is therefore beneficial to avoid unnecessarily aggressive traveling that does not result in increased production.

SUMMARY OF THE INVENTION

This disclosure is related to systems and methods for providing contention avoidance within a mining environment, and specifically, to a system and method for analyzing movement of mobile equipment within a mining environment to identify and minimize occurrences of contention.

In one implementation, the present invention is a method of navigating a vehicle through a mining environment to a target destination. The method includes identifying a route through the mining environment to the target destination for the vehicle, determining a first speed profile for at least a portion of the route, and identifying a potential contention condition associated with the route. The method includes using the potential contention condition along the route to determine a second speed profile for at least a portion of the route, determining an optimized speed profile using the first speed profile and the second speed profile, and communicating at least a portion of the optimized speed profile to the vehicle.

In another implementation, the present invention is a system comprising a processor configured to identify a route through the mining environment to the target destination for the vehicle, determine a first speed profile for at least a portion of the route, and identify a potential contention condition associated with the route. The processor is configured to use the potential contention condition along the route to determine a second speed profile for at least a portion of the route, determine an optimized speed profile using the first speed profile and the second speed profile, and communicate at least a portion of the optimized speed profile to the vehicle.

In another implementation, the present invention is a non-transitory computer-readable medium containing instructions that, when executed by a processor, cause the processor to perform the steps of identifying a route through the mining environment to the target destination for the vehicle, determining a first speed profile for at least a portion of the route, and identifying a potential contention condition associated with the route. The instructions cause the processor to further performs the steps of using the potential contention condition along the route to determine a second speed profile for at least a portion of the route, determining an optimized speed profile using the first speed profile and the second speed profile, and communicating at least a portion of the optimized speed profile to the vehicle.

Other advantages and features of the invention will be apparent to those having ordinary skill in the art upon reading the following detailed description and claims.

DETAILED DESCRIPTION OF THE INVENTION

The present system reduces losses and costs associated with contention occurring within a mining environment. The system monitors the movement of a number of vehicles within a mine environment and identifies possible points of contention. Contention may occur, for example, at intersections, loading locations, dumping locations, roads with various traffic control restrictions (e.g., on speed, a number of equipment, passing, one way traffic, etc.), and bridges.

When a potential contention condition is identified, the system takes action to reduce the likelihood that the condition will occur. In one example, the system provides direct feedback to vehicle operators indicating an optimal speed profile for each vehicle to avoid contention. The feedback may be provided continuously or in discrete segments.

For vehicles having operators able to manually control the vehicle's speed, the system can provide the operator with a target travel speed as well as a route selected to avoid contention. The target speed may be communicated audibly or visually to the vehicle operator. The system may also signal that the operator needs to slow down or speed up to match the target speed, depending upon a current speed of the vehicle.

Where a maximum speed of a vehicle can be set dynamically, the system can set a maximum permissible speed for the vehicle, where the maximum speed is selected to avoid contention (the selected maximum speed may vary as the vehicle progresses along a particular assigned route). In that case, the operator is only required to engage the accelerator and other onboard systems in order to realize the set maximum speed. In cases where the system can directly control the actual speed of a vehicle (e.g., in the case of autonomous equipment), the system sets the vehicle's speed to an optimal value to avoid contention.

Figure 1:
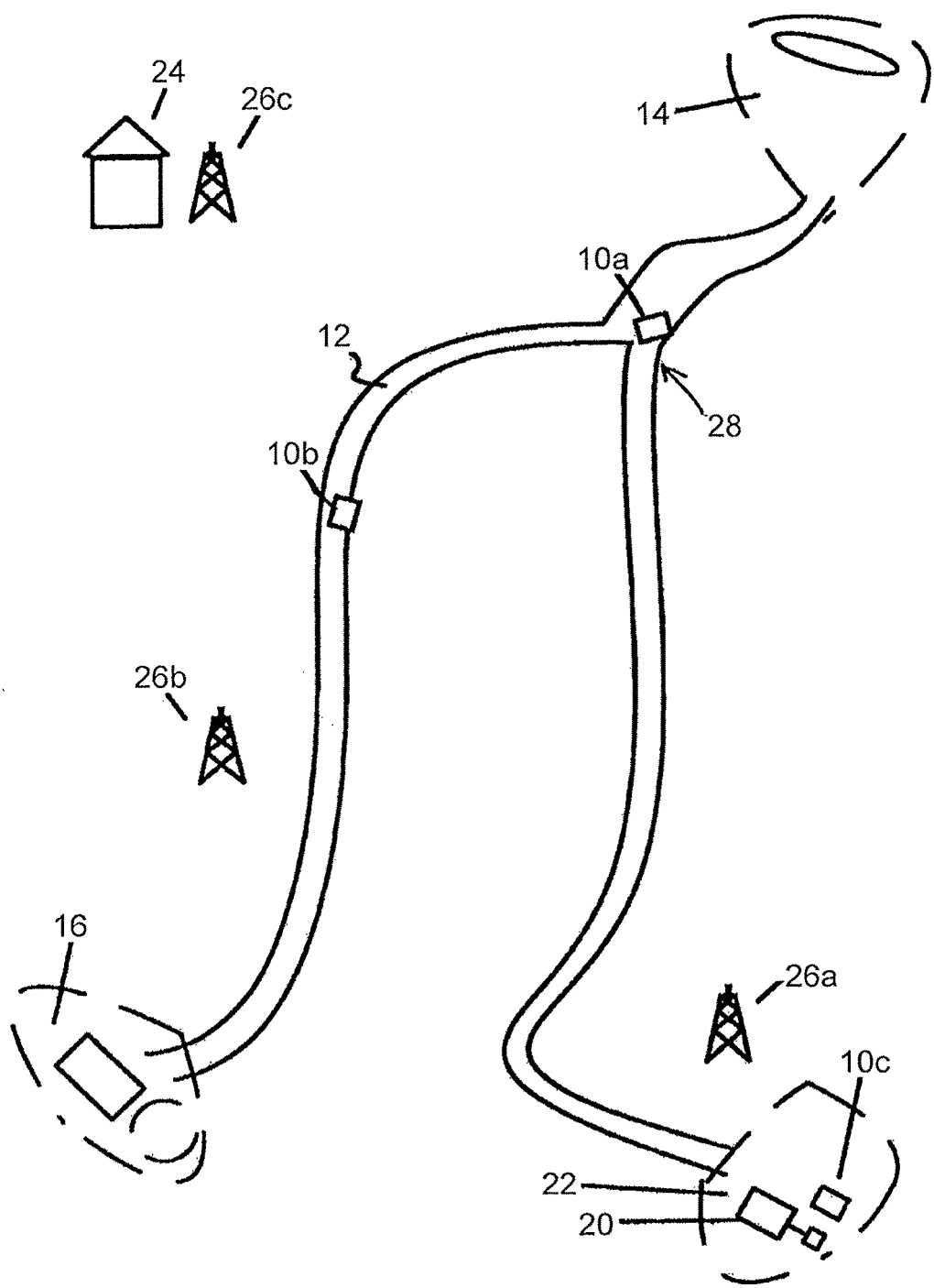
FIG. 1 is a schematic diagram of an open pit mining environment showing a number of vehicles navigating through the mine.

FIG. 1 is an illustration of an open pit mining environment where systems and methods according to embodiments of the invention can be implemented. In the environment of FIG. 1, a plurality of mine haul trucks 10*a-c* operate on a mine haul route network 12. Mine haul trucks 10*a-c* perform hauling tasks, for example, by moving material between a shovel 20 site 22, a crusher site 16, and a dump or stockpile site 14.

Each vehicle in the mine environment can be equipped with an array of navigation, communication, and data gathering equipment that assist the vehicle's operator. Each vehicle may be equipped with a mobile computing device, for example, a tablet personal computer, a personal digital assistant, or a "smart phone" for implementing the present system.

The vehicles include sensors or receivers (e.g., Global Positioning System (GPS) receivers) that generate information about the time-varying position, orientation, and speed of the vehicles. The position and velocity sensors may receive data from a geolocation receiver that generates information about the time-varying position of the vehicles based upon transmissions from transmitters located terrestrially, within the mining environment. Gyroscopes or other inertial navigation systems can also be used to locate the haul truck within the mine environment.

The mine can include a communications network allowing computer systems on each vehicle to communicate with one another as well as with a centralized dispatch or control system located at central site 24. The communications network is represented as a collection of wireless data transceivers (e.g., transceivers 26*a*, 26*b*, and 26*c*), such as would be suitable in implementing a WiFi, WiMax, GPRS, EDGE or equivalent wireless network. These network architecture examples are not limiting.

In one implementation of the present system, the central control system is configured to monitor a position of vehicles operating within the mining environment. By analyzing those movements, and taking into consideration other constraints, the central system can identify potential contention conditions. The system can then take appropriate action to minimize the likelihood of the contention conditions occurring. For example, the system may instruct vehicles to adopt different speed profiles as they maneuver through the mine to avoid contention. For manually controlled vehicles, the system may set a goal speed or a maximum allowable speed. The speed is selected so that, if the vehicle travels at that speed, the contention condition will be avoided. In the case of autonomous vehicles, the system may directly control the vehicle's route as well as the vehicle's speed to avoid the contention condition.

With reference to FIG. 1, the mine site includes a number of potential contention sites. Route network 12 includes a number of different roadways. Each roadway has a number of attributes that are used in identifying potential contention. Example attributes include speed limit, slope, maximum weight limits, one-way restrictions, and the like. Network 12 may also include a number of intersections (e.g., intersection 28) and destination points (e.g., shovel site 22, crusher site 16, or stockpile site 14).

Road network 12 presents a number of potential contention conditions. At intersection 28, for example, two or more vehicles may reach the intersection at approximately the same time. In that case, one of the vehicles may be required to come to a complete halt or slow-down substantially. Such a stop or slow-down can result in very inefficient operation of the stopping or slowing vehicle. If communication between the two or more vehicles is not clear, all vehicles may be forced to stop before one of the vehicles passes through the intersection.

Along a particular roadway, contention may arise if a faster vehicle is forced to follow behind a slower vehicle. In that case, it may be more efficient for the faster vehicle to travel more slowly to that roadway, thereby avoiding the slower vehicle.

The mine site also includes a number of resources (e.g., facilities) that may be the source of contention such as waste dumps, leach pads, crushers, and stockpiles. A given mining operation may have several loading and dumping locations connected by a road network. These resources have limited capacities and only a finite number of trucks can occupy and interact with the resource at a given time. Accordingly, a vehicle arriving at a fully occupied resource would be required to wait until the resource becomes available.

In general, a mine dispatcher or fleet management system assigns trucks to a certain destination, and may, in some cases, specify the route by which the truck should travel. Truck drivers try to maximize their productivity, or tons moved per hour, by minimizing the travel time between destinations. This typically takes the form of traveling at the maximum speed possible, limited only by speed limits and the truck's capabilities.

Where a single truck is operating alone in a mine, an increase in vehicle speed would always result in an increase in productivity. However, mining operations typically have dozens of trucks or other vehicles sharing loading resources, dumping locations, and roadways. Often, traveling at the maximum speed possible does not result in an increase in productivity because the truck arrives at a loading or dumping resource before the resource is available. Similarly, a truck may be forced to slow or stop at an occupied intersection, or to slow because of a slower vehicle traveling the same route (in many situations mining haulage vehicles are prohibited from overtaking other vehicles for safety reasons).

Figure 2:
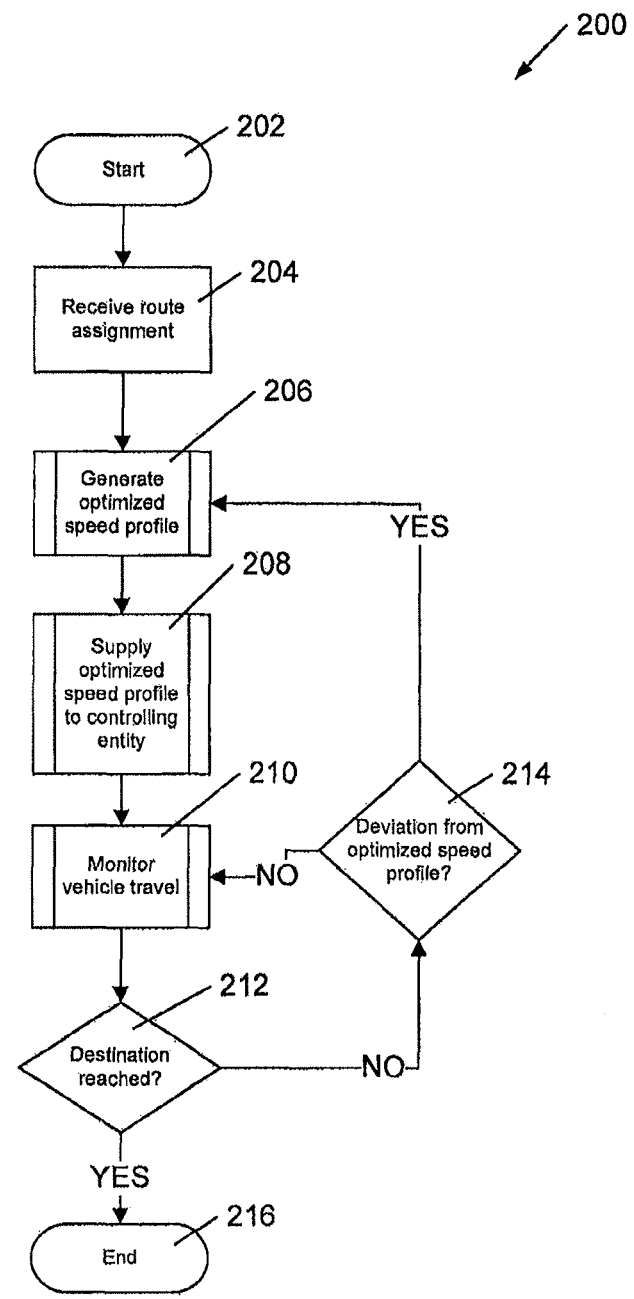
FIG. 2 is a flowchart showing an exemplary method for navigating a vehicle through a mining environment to a target destination, while avoiding a potential contention condition.

FIG. 2 is a flowchart showing method 200 for navigating a vehicle through a mining environment to a target destination, while avoiding a potential contention condition. The method involves determining an optimized speed profile, which prescribes a particular target speed for the vehicle as the vehicle navigates along an assigned route. The optimized speed profile is selected to avoid potential contention situations that may occur within the mine environment as well as meet other mine criteria, such as maximizing productivity or efficiency.

The method may be executed by a mine's centralized control system, where the control system is in communication with a number of data sources providing information used by the control system to direct vehicles as the vehicles navigate through the mine environment. Example data sources include those that maintain a listing of information describing vehicles present within the mine environment, as well as their location, speeds, and destinations. Additional data sources may include those that describe candidate routes through the mine environment, as well as restrictions (e.g., speed limits, traffic controls, weight restrictions) associated with those routes. In other implementations, the method is executed by a navigation system residing on a particular vehicle, where the navigation system is configured to provide navigation instructions to that vehicle either through an autonomous vehicle controller or through a human-machine interface to a vehicle operator. As will be appreciated, many different computer systems working in isolated fashion or in combination may be used to execute the present method.

In step 202, method 200 is initiated for a particular vehicle. The vehicle has a number of known attributes that include the vehicle's maximum speed, acceleration capabilities, fuel efficiency at a number of different speeds, weight, loaded capacity, type, and the like. In step 204, a route assignment is defined for the vehicle. The route assignment describes a particular route that the vehicle is to follow through the mine's road network to reach a target destination. The desired destination may be selected autonomously by a central control system based upon the mine's requirements, or may be requested by an operator of the vehicle. The route assignment will generally define a number of road segments along which the vehicle is to travel in order to reach the target destination. The assigned route may be characterized by a series of road segments, a destination resource, and/or any intermediate resources required by the production cycle (e.g. lime bin, radiation scanner).

After the route assignment is generated, in step 206 an optimized speed profile for the route is generated. A "speed profile" defines, for each point along a particular route, a particular speed. The speed profile may include a number of distinct speeds that are defined for particular road segments of a route. Alternatively, the speed profile may define a number of distinct speeds at each of a number of points along a particular route. For example, a speed profile may define a speed for points every 10 feet along a particular route. Alternatively, a speed profile may be a continuous curve that defines a speed at every point along a particular route.

An "optimized speed profile" is a speed profile that specifies how fast a particular vehicle should travel along an assigned route to meet certain optimization criteria or constraints. As described below, the optimized speed profile is optimized to minimize contention that may occur as the vehicle travels along the route assignment. The speed profile may also be optimized to meet other criteria defined by the mine. For example, the optimized speed profile may be further optimized to minimize fuel consumption by the vehicle or, alternatively, to maximize the vehicle's productivity (e.g., tons moved per unit of time) of the vehicle, or combinations thereof.

Figure 3A:
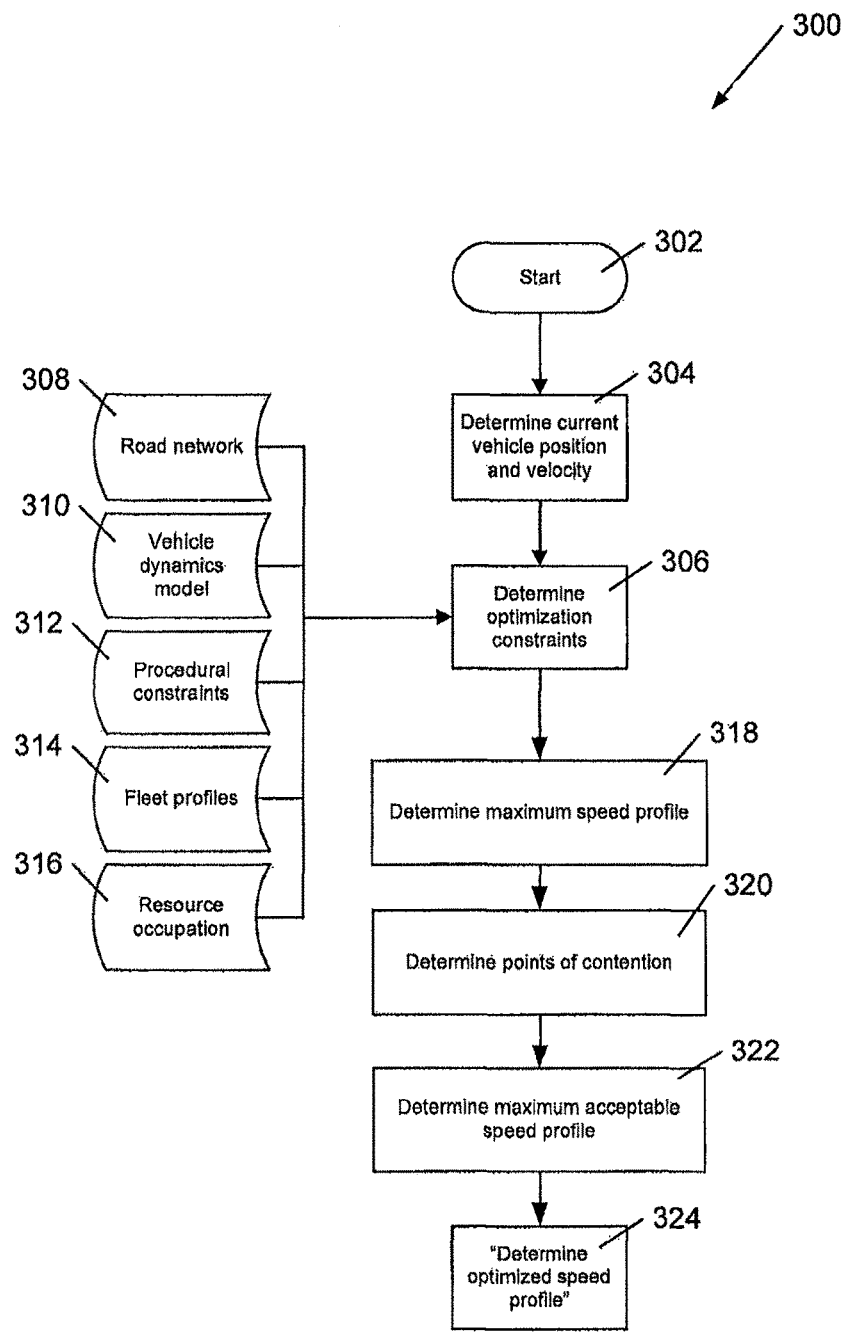
FIGS. 3A-3C are flowcharts depicting exemplary details of individual steps in the method of FIG. 2.

Given a particular route assignment, FIG. 3A is a flowchart illustrating further detail of step 206 of FIG. 2. Method 300, therefore, is a method for creating an optimized speed profile for a particular vehicle that will be traveling along a known route assignment.

In step 302, the method begins. At this point, the route assignment for the vehicle is known. In step 304, the current position and velocity of the vehicle is determined. This determination may be made automatically through the use of a location sensors (e.g., a GPS sensor), or manually, such as by a vehicle operator keying the vehicle's current location and velocity into an appropriate user interface.

In step 306, with the vehicle's current location and velocity determined, a number of optimization constraints for the route assignment are determined. The constraints are used to define boundaries for candidate speed profiles for the vehicle along the assigned route. The constraints may include speed limits, contention conditions, vehicle limitations on acceleration/top speed, right-of-way limitations, steep road grades, and the like. For example, a particular optimized speed profile cannot call for the vehicle to exceed speed limits that may be defined along a particular portion of the route. Similarly, the optimized speed profile cannot call for the vehicle to travel at a speed that is faster than the maximum speed of the vehicle.

The identification of constraints may require communication with a number of data sources that store information describing the mine, the mine's road network, the vehicle, and the fleet of other vehicles operating within the mine.

Road network database 308, for example, defines a road network that is constituted of an interconnected road network of many road segments within the mining environment. For each road segment in the road network, database 308 identifies road grades and information regarding the location and layout of intersections in the road network. Road network database 308 can be used to define constraints to the vehicle's candidate speed profiles that include a particular maximum speed for traveling up steep grades, intersections that will require the vehicle to stop or slow down, and the like.

Vehicle dynamics model database 310 defines a number of performance attributes of the vehicle. Example attributes include the maximum speed and acceleration attainable by the vehicle for a given set of conditions. The vehicle dynamics model could be simple, such as a matrix mapping vehicle maximum speed to grade, payload, and vehicle type. The vehicle dynamics model may be more complete, though, integrating information such as road conditions, tire wear, and weather conditions. Given the vehicle's current status (e.g., carrying a load, or empty), vehicle dynamics model 310 can be used to define speed constraints such as a maximum speed for the vehicle, a most efficient speed for the vehicle, and the like.

Procedural constraints database 312 defines mine-specific limitations on vehicle travel. The database defines a number of speed constraints that may occur along the assigned route. The constraints can include speed limits, minimum following distances, overtaking restrictions, and priorities at intersections for particular vehicle types or conditions.

Fleet profile database 314 stores information describing the entire fleet of vehicles that are part of the mine environment. The information can include the current location and velocity of the fleet vehicles, as well as the current target destination and assigned route of each vehicle in the fleet. The database may also store expected speed profiles for the fleet and resources that are being used by, or will be used by, members of the fleet. The speed profiles for the fleet vehicles may be static, or could be determined and maintained based upon prior speed optimization data generated for the other vehicles in the mine environment. Fleet profile database 314 can be used to identify potential points of contention occurring along the assigned route.

Resource occupation database 316 identifies the different resources within the mine environment that can be occupied preventing access to other vehicles. Resource occupation database 316 can be used to estimate the duration of occupation of a particular resource by a vehicle. Resource occupation data could be a manual input or a real-time, dynamic value provided by a fleet management system. By predicting when certain resources will be occupied, resource occupation database 316 provides constraints for the optimized speed profile as the optimized speed profile should not result in a vehicle arriving at a particular resource when the resource is not available to the vehicle. If that were to occur, the vehicle would probably have been able to drive more slowly (thereby saving resources) in order to reach the resource at the time the resource is actually available (thereby avoiding a delay).

In step 318, for the assigned route, a maximum speed profile is determined. The maximum speed profile describes the maximum speed that the vehicle could travel along the assigned route, assuming no contention conditions (and leaving immediately). The maximum speed at each point along the route can be determined based upon the vehicle dynamic model (which describes the maximum speed and acceleration capabilities of the vehicle), as well as information stored in road network database 308 and procedure constraints database 312, which, in combination, describe speed limits, grades, road network layout and other attributes of the roadway that can be used to determine the maximum speed profile for the vehicle along the assigned route. In essence, the maximum speed profile describes the maximum speed with which the vehicle could proceed along the assigned route assuming that no points of contention exist within the mine network. Example maximum speed profiles are illustrated in FIGS. 4B (element 410), 5B (element 512), 6B (element 612), and 7B (element 712).

In step 320, fleet profile database 314 and resource occupation database 316 are used to identify potential points of contention along the assigned route. This may involve identifying other vehicles that will reach an intersection at the same time as the vehicle, where the other vehicle would have the right-of-way, identifying other, slower vehicles, that will occupy a particular portion of the vehicle's assigned route and hinder the vehicle's progress, resources that are required by the vehicle (e.g., crushers, dumps, or shovels) that may be occupied, and the like. The points of contention are identified assuming the vehicle is traveling according to the maximum speed profile identified in step 318.

Given a set of expected speed profiles for vehicles traveling along a particular mine roadway (generated, for example, using the profiles stored in fleet profile database 314), the expected distance between vehicles at any given time can be determined. Roadway contention occurs when the expected distance between vehicles violates a rule governing vehicle following distance.

In one implementation of the present system, the rules governing vehicle following distance (and the identification of contention conditions based thereon) may be simple, static policies such as "vehicle following distance must be no less than 200 ft." Following distance may also be a complex and dynamic value, incorporating vehicle characteristics such as speed and weight, or external factors like road grade and weather conditions. The identification of roadway contention could then be handled by a system software module that checks vehicle spacing against a following distance rule over a specified time period.

In one example, a vehicle, $V_1$, is scheduled to travel along a route at a known speed profile. Other vehicles may also be traveling along this route ahead of $V_1$ with their own known speed profiles. The minimum following distance between $V_1$ and another vehicle $V_i$ at time t is determined by some function, $f(V_1,V_i,t)$. At any time t, the distance between $V_1$ and another vehicle $V_i$ is given by a function $D(V_1,V_i,t)$. Roadway contention between $V_1$ and $V_i$ occurs at time t when $D(V_1,V_i,t) \leq f(V_1,V_i,t)$.

In one implementation, the system may check for contention between all vehicles operating in the mine each time a new expected speed profile is generated. However, an alternative approach may use many simplifying steps to reduce the total workload by narrowing the number of vehicles or the time period to check.

In a similar fashion to contention avoid rules relating to vehicle following distance, mine environments have specific rules to govern the occupation of intersections and resources. These rules may control priority access to an intersection or resource, or set a buffer time between occupation by different vehicles. The identification process would be similar to that for road contention; given a set of speed profiles and a resource occupation schedule, identify violations of rules within a given time period.

After identifying those potential points of contention, in step 322 a minimum acceptable speed profile is determined. The minimum acceptable speed profile describes the speed profile that enables a vehicle to depart at the latest possible time and travel at maximum speed along its assigned route while both avoiding the points of contention identified in step 320 and making maximum use of available resources. It is a minimum acceptable speed profile because should the vehicle's speed fall below that prescribed in the minimum acceptable speed profile, the vehicle will be unable to return to the speed profile and, as such, resources will be wasted.

Generally, the minimum acceptable speed profile is determined by delaying the maximum speed profile by a particular time period selected to avoid potential contention conditions (i.e., a delayed maximum speed profile). For example, if it is determined that a resource to be used by the vehicle would not be available until 5 minutes after the vehicle arrived assuming the vehicle travels according to the maximum speed profile, the maximum speed profile may be delayed by those 5 minutes to create the minimum acceptable speed profile. In various implementations, though, the amount of delay may be increased or decrease based upon various system rules. For example, an additional delay may be implemented to provide satisfactory safety margins (particular when the contention relates to vehicles crossing at an intersection). Element 416 of FIG. 4B, for example, shows a minimum acceptable speed profile that is equal to the maximum speed profile delayed by a period of time selected to avoid a contention condition.

The maximum speed profile and minimum acceptable speed profile define particular boundaries for how the vehicle may travel along the assigned route. The maximum speed profile describes the fastest way the vehicle can navigate along the assigned route. The maximum speed profile assumes that the vehicle begins driving at time $t_0$ (i.e., the vehicle leaves immediately) and proceeds along the route using maximum acceleration, maximum speed and maximum braking. The minimum acceptable speed profile provides another boundary that defines the latest possible moment that the vehicle could begin driving along the assigned route while both avoiding contention and not wasting any resource (e.g., causing a resource to sit unused).

With the maximum speed profile and the minimum acceptable speed profile defined, in step 324 an optimized speed profile is determined. The optimized speed profile will be a speed profile that runs between the maximum speed profile and the minimum acceptable speed profile, determined in steps 318 and 322, respectively.

Between the maximum speed profile and minimum acceptable speed profile, a number of candidate speed profiles can be evaluated to determine an optimized speed profile. The different candidate speed profiles can be evaluated using a scoring function and a set of constraints.

Then, well-established optimization methods could be used to find a speed profile that maximizes or minimizes the scoring function within the set of constraints. Scoring functions could be designed for a specific operation balancing priorities between production and resource consumption. Scoring function inputs would provide quantitative measures of the cost or impact of resource consumption or production rates.

In a mining environment, an important factor in the scoring function may be profitability. Traditionally, mines have sought to maximize production rates. However, as the industry advances, more and more operations are targeting minimized cost per ton and improve cohesion between the mining operation and processing/delivery facilities. These targets are subject to numerous constraining factors. Constraints may be real, such as the maximum speed a haul truck can achieve, or procedural, such as an artificial speed limit for safety.

In speed profile optimization, goals and constraints can be combined into a scoring function. Using methods in operations research, the scoring function would be maximized or minimized by varying the speed profile. The scoring function may utilize tables or functions characterizing things such as fuel consumption, tire wear, or value per ton.

As an example, increasing average haul truck speed may result in higher production rates, but that increase comes at a cost of increased fuel burn. A mining operation generally wants to maximize profitability by balancing production rates with fuel costs. A scoring function for speed profiles may include sub-functions for the increased value from increased production and the increased costs from higher fuel burn rates. This may be represented by the equation $f(P)=V(P)-C(P)$, where P is the candidate speed profile, $V(P)$ is a function giving the expected production value in dollars for the given speed profile P, and $C(P)$ is a function giving the expected fuel costs in dollars for the given speed profile. The mine may choose to set a minimum production value to ensure a baseline production level. The scoring function could be limited by this strategic constraint, as well as practical constraints like: Vehicle speed may not exceed maximum possible speed, Vehicle speed may not exceed speed limits, and/or Vehicle may not violate following distance rules. Generally, the mathematical representation of constraints and scoring functions may vary dependant on the optimization method used.

Returning to FIG. 2, after the optimized speed profile has been determined in step 206, the optimized speed profile is communicated to a controlling entity of the vehicle in step 208. The controlling entity is the entity configured to control or drive the vehicle in accordance with the optimized speed profile. In the case of a manually operated vehicle, the controlling entity is the human operator or driver of the vehicle. Accordingly, step 208 may involve the optimized speed profile being communicated to the operator via a human-machine interface that provides an indication of a 'goal' or 'desired' speed at the vehicle's current position along the assigned route. The vehicle operator would then drive the vehicle at the desired speed depicted by the human-machine interface. In the case of an autonomous vehicle, the controlling entity is a controller that is in direct control of the vehicle. As such, the controlling entity is supplied with the optimized speed profile and uses that speed profile to control the vehicle's speed as the vehicle proceeds along the assigned route.

Figure 3B:
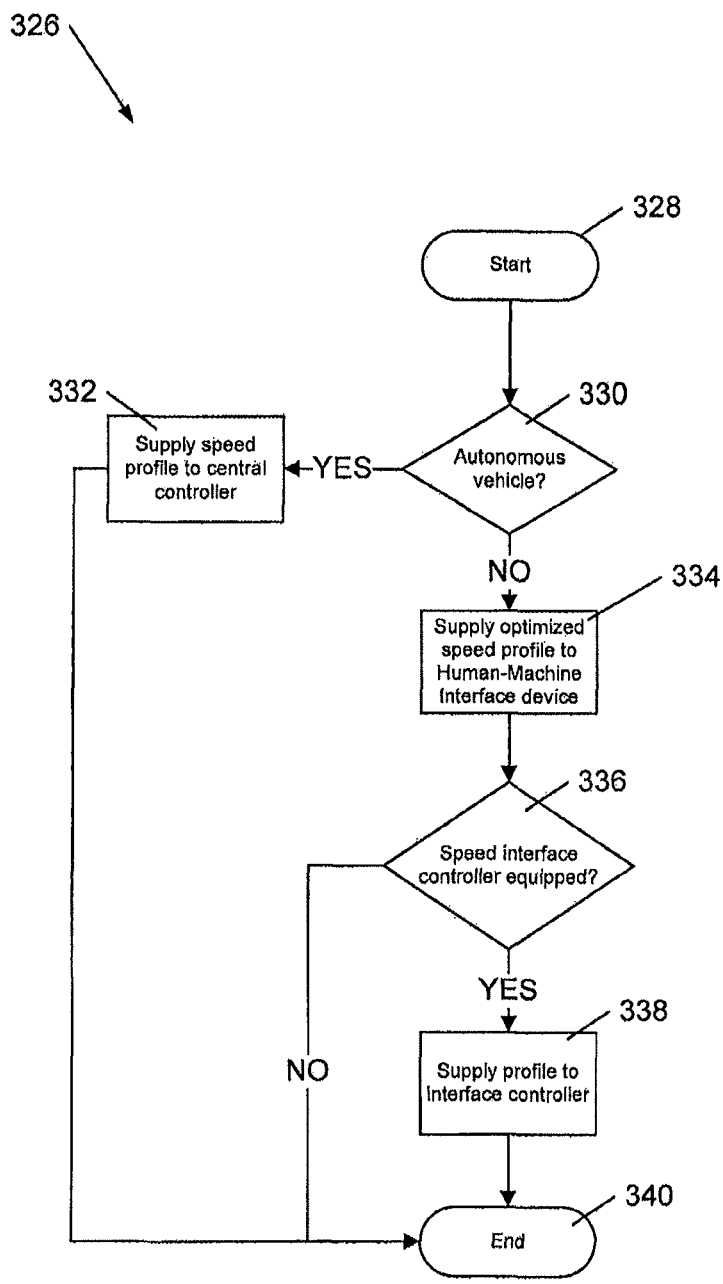

FIG. 3B is a flowchart illustrating further detail of step 208 of FIG. 2. Method 326, therefore, is a method for supplying an optimized speed profile to a controlling entity of the vehicle. In step 328 the method starts. In step 330, a determination is made as to whether the current vehicle is an autonomous vehicle. If so, in step 332 the optimized speed profile is communicated to the central controller of the autonomous vehicle. The central controller then uses the optimized speed profile to control the speed of the vehicle as the vehicle navigates along the assigned route.

Alternatively, if the vehicle is not autonomous (e.g., the vehicle is manually operated), in step 334 the optimized speed profile (or a portion thereof) is provided to a human-machine interface device located within the vehicle and accessible to the vehicle operator. The human-machine interface may include a readout to indicate the desired vehicle speed at the current point along the vehicle's assigned route. The human-machine interface may include one or more alert (e.g., visual, audible, tactile, haptic, or otherwise) to indicate to the operator that the vehicle is not traveling at the optimized speed at the vehicle's current point on the assigned route. This could also include notifications that indicate the operator should either speed up or slow down in order to match the optimized speed at that point. Example human-machine interface devices include a display of the target speed, a series of lights showing over/underspeed, or an audible alert that changes frequency or volume as speed becomes off-target from the optimized speed profile. The human-machine interfaces may be located on the vehicle or, in some cases, may be located along the route of the vehicle, such as in the form of signs or readouts that display a target speed, turn indications, or other instructions as the vehicle passes.

As the vehicle navigates along the assigned route, the human-machine interface provides updates to the vehicle operator as to the optimized speed at the current point along the assigned route and notifies the operator if changes to the vehicle's current speed are required.

In some cases, manually operated vehicles will include speed interface controllers. These speed interface controllers are semi-autonomous units installed into the vehicle that have some control over the vehicle's speed. Example speed interface controllers include engine controllers, on-board fleet management computers, or remote control systems that relay speed commands to the vehicle over a wireless network.

The speed interface controller may be configured to automatically adjust the vehicle's speed (with a manual override that can be operated by the vehicle operator), or the controller may set a maximum speed for the vehicle. If, in step 336 it is determined that the vehicle is equipped with a speed interface controller, the controller is supplied with the optimized speed profile (or at least a portion thereof) in step 338. The speed interface controller can then operate in accordance with the optimized speed profile to control the vehicle's speed by, for example, limiting a maximum speed of the vehicle to the desired speed at a particular point along the assigned route. The driver then simply drives the vehicle at the maximum available speed along the route. As the vehicle progresses along the assigned route, the speed interface controller adjusts the vehicle's maximum speed in accordance with the optimized speed profile.

In step 340 the method ends.

Returning to FIG. 2, after the optimized speed profile is provided to the controlling entity in step 208, the vehicle begins to navigate along the assigned route. As the vehicle travels, the vehicle's progress is monitored in step 210.

Figure 3C:
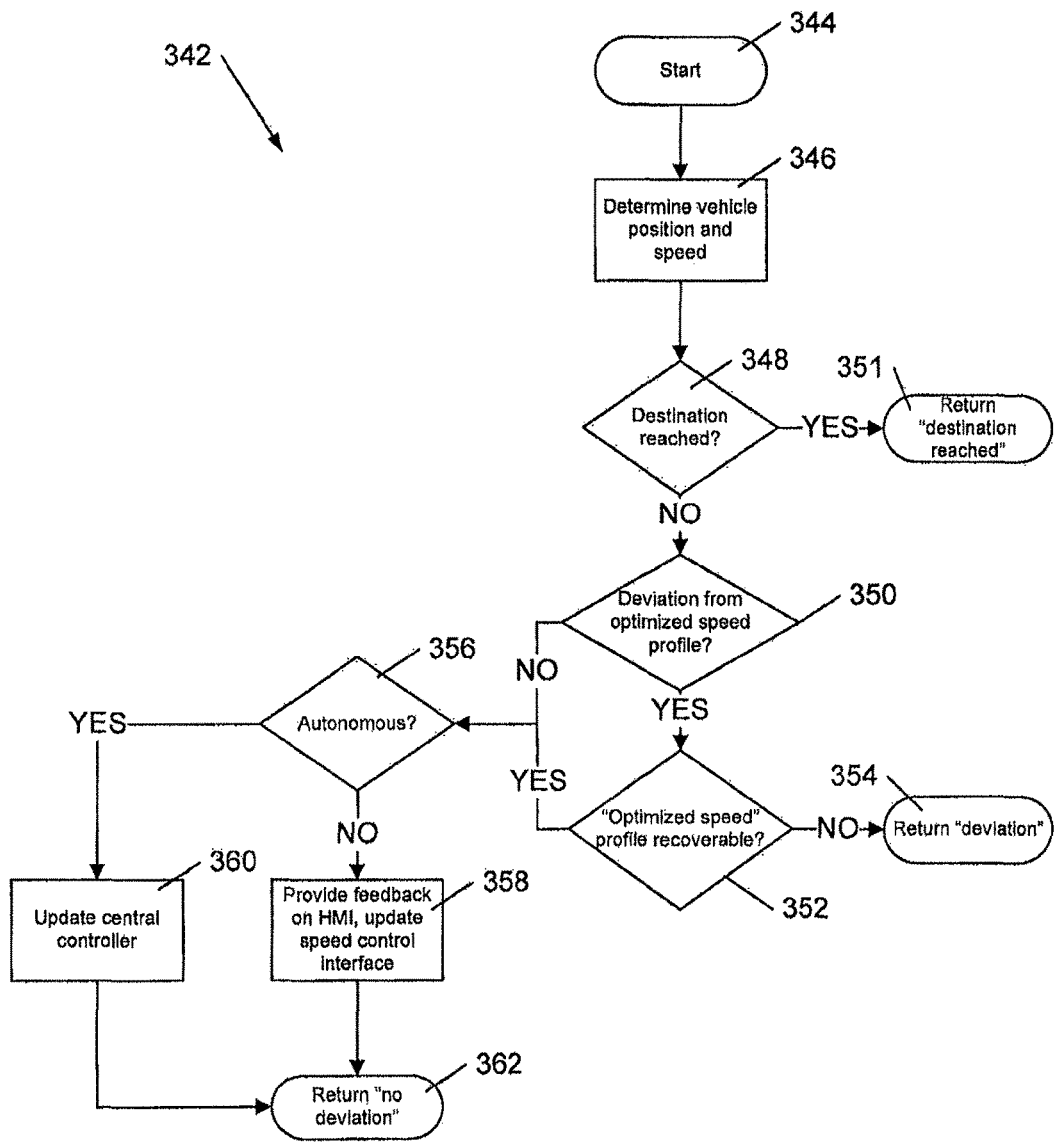

FIG. 3C is a flowchart illustrating further detail of step 210 of FIG. 2. Method 342, therefore, is a method of monitoring the vehicle's travel as it progresses along the assigned route. The method begins at step 344. In step 346, the vehicle's current position and velocity are determined using, for example, GPS sensors or other location sensors. In step 348, the vehicle's current location is compared to a target destination location (possibly defined as the last point of the assigned route) to determine whether the vehicle has reached the target destination. This comparison can be determined by the vehicle's proximity to the target destination (e.g., determined by any navigation or local ranging methods), or by state information provided by a fleet management system, for example. If the vehicle has reached the target destination, in step 351 the method outputs a return value of "destination reached."

If, however, the vehicle has not reached the target destination, in step 350 a determination is made as to whether the vehicle has deviated from the optimized speed profile determined previously. In one implementation, the actual speed profile of the vehicle and assigned optimized speed profile are compared by assessing current (e.g., actual) speed and distance traveled versus expected.

If a deviation from the optimized speed profile is detected, in step 352 a determination is made as to whether the deviation is recoverable. That is, whether the vehicle can modify its current operating conditions in order to return to operating in accordance with the optimized speed profile. For example, if a slippery condition causes a vehicle to have a slow take-off, increased speed over a short distance may make up that time and eliminate the need for re-optimization. Similarly, if, for a period of time, the vehicle exceeds the speeds prescribed in the optimized speed profile, a period of reduced speed would allow the vehicle to return to the optimized speed profile. In some cases, though, the vehicle has deviated sufficiently far from the optimized speed profile that the vehicle is incapable of returning to the optimized speed profile. If the optimized speed profile is not recoverable, in step 354 the method outputs a return value of "deviation."

If, however, the optimized speed profile is recoverable, if the vehicle is not an autonomous vehicle (as determined in step 356), in step 358 feedback is provided to an appropriate human-machine interface to instruct the vehicle operator to modify the vehicle's operation conditions (e.g., by slowing down or speeding up) in order to return to operating in accordance with the optimized speed profile. In some cases, this step requires updating a speed control interface of the vehicle in order to allow the operator to exceed the original speed limitations to recover the current speed profile.

Alternatively, if the vehicle is autonomous, in step 360 the central controller of the autonomous vehicle is instructed to compensate for the vehicle's deviation away from the optimized speed profile. This may be performed in accordance with known autonomous vehicle-control methods. Finally, after either of steps 360 and 358, in step 362 the method returns a value of "no deviation."

Returning to FIG. 2, after executing step 210, a determination is made in step 212 as to whether the vehicle has reached the target destination. If the vehicle has reached the target destination (e.g., the value returned by the method of step 210 of FIG. 3C is "destination reached"), then in step 216 the method ends.

Alternatively, if the vehicle has not reached the target destination (and so is still navigating along the assigned route), in step 214 a determination is made as to whether the vehicle has deviated from the optimized speed profile. If so (e.g., the value returned by the method of step 210 of FIG. 3C is "deviation"), then the method returns to step 206 in order to calculate a new optimized speed profile. However, if the vehicle has not deviated from the optimized speed profile, then the method moves to step 210 in order to continue monitoring the vehicle's movement along the assigned route.

FIGS. 4A, 5A, 6A, and 7A are figures illustrating potential contention conditions for which an optimized speed profile can be created according to the method of FIG. 2.

Figure 4A:
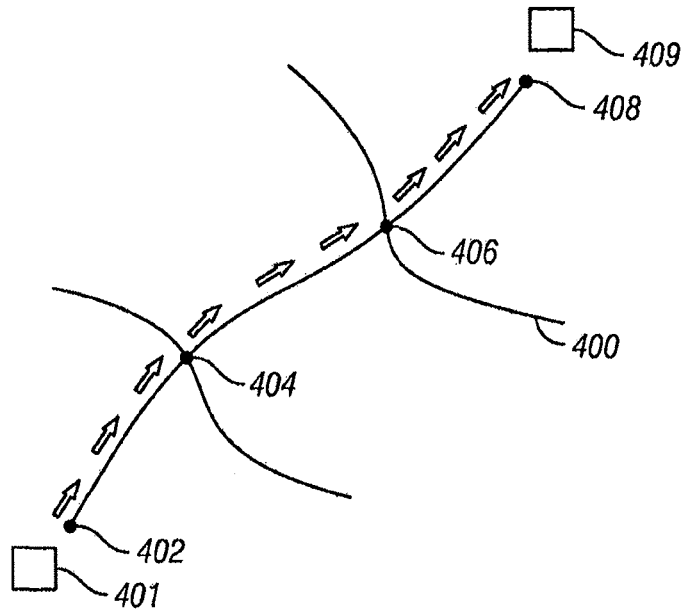
FIGS. 4A and 4B illustrate the determination of an optimized speed profile for a potential contention condition involving an unavailable resource.
Figure 4B:
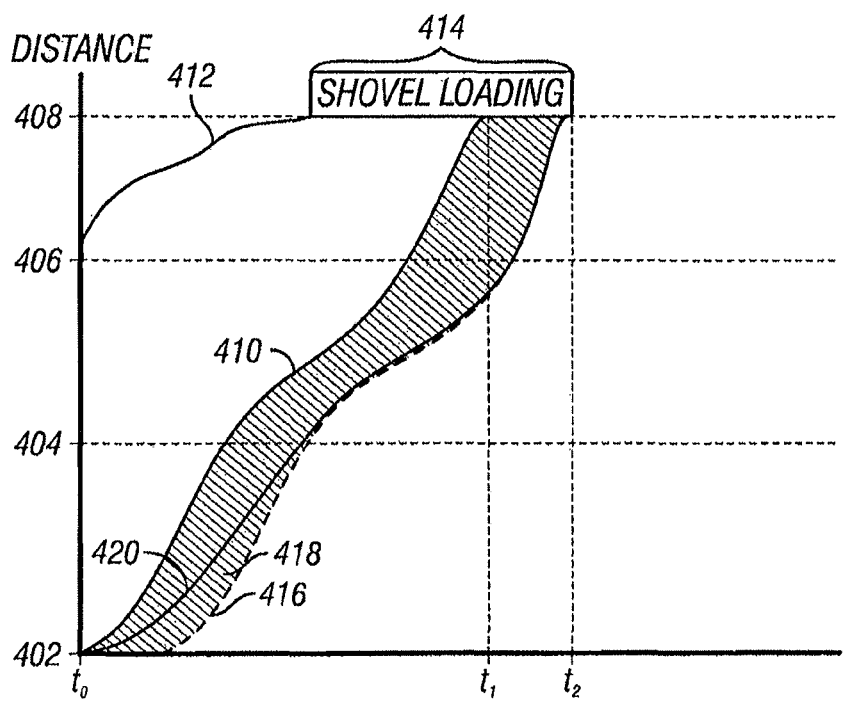

FIGS. 4A and 4B illustrate the determination of an optimized speed profile for a potential contention condition involving an unavailable resource. FIG. 4A shows road network 400 as it may exist within a mining environment. Road network 400 includes a number of intersections 404, and 406. Vehicle 401, located at starting point 402, is assigned a route to drive through the road network 400 to reach a target destination. In this case, the target destination is a resource 409 located at point 408. Resource 409 could be a dump site, a crusher, or a shovel. Resource 409 has limited capacity and may, in certain circumstances, be occupied by a number of other vehicles. Accordingly, resource 409 is a potential point of contention.

FIG. 4B is a graph showing a number of speed profiles for different vehicles operating within the mining environment in which road network 400 is located. The y-axis of FIG. 4B represents a location along the vehicle's assigned route between point 402 and point 408. The x-axis represents time.

FIG. 4B includes a number of speed profiles 410, 412, 416, and 420. Each speed profile represents the location of a particular vehicle at a given time. Because each speed profile curve maps vehicle location to time, the slope of the curves indicates the vehicle's speed at a particular location and time along a particular route. The speed profiles, therefore, can be used to determine how fast a particular vehicle should be traveling at a particular point along an assigned route in order to be operating in conformance with the speed profile.

In this example, vehicle 401 has been assigned a route to travel from point 402 to point 408 in order to use resource 409 (e.g., a shovel). The present system, therefore determines an optimized speed profile allowing vehicle 401 to reach resource 409 while minimizing potential contention.

In order to determine an optimized speed profile for vehicle 401, the present system first determines a maximum speed profile for vehicle 401 to navigate along the assigned route (see, for example, step 318 of FIG. 3A). In FIG. 4B, the maximum speed profile is shown by curve 410. The maximum speed profile 410 presumes that vehicle 401 begins driving along the assigned route immediately (i.e., at time $t_0$) and proceeds along the assigned route at the vehicle's maximum speed. The maximum speed profile 410 can be determined by analyzing characteristics of the road network, such as grade, surface, and the like (stored, for example, in road network database 308), procedural constraints such as speed limits, passing restrictions, minimum following distances, priorities at intersections, and the like (stored, for example, in procedural constraints database 312), vehicle dynamics such as maximum speed and acceleration under a number of operating conditions (stored, for example, in vehicle dynamics model database 310). In short, maximum speed profile 410 is the speed profile that would allow vehicle 401 to reach resource 409 in the shortest amount of time, assuming no contention.

Before the optimized speed profile can be generated for vehicle 401, therefore, it is necessary to identify potential points of contention. In this example, another vehicle is in the process of occupying resource 409, preventing vehicle 401 from using resource 409 for some period of time. The second vehicle's speed profile is shown by curve 412 on FIG. 4B. Curve 412 shows the second vehicle driving from location 406 to location 408 (where resource 409 is located) and the occupying the resource for a period of time 414. During time period 414, resource 409 is unavailable to other vehicles. The movement of the second vehicle can be determined by analyzing the movement of other vehicles within the mine environment (e.g., using data provided by fleet profiles database 314) in combination with the utilization (or anticipated utilization) of resources (e.g., using data provided by resource occupation database 316).

As shown in FIG. 4B, if vehicle 401 were to follow maximum speed profile 410, vehicle 401 would reach resource 409 while resource 409 is still occupied by the second vehicle. As a result, vehicle 401 would have to wait for a period of time (from $t_1$ to $t_2$) before resource 409 can be utilized. This period of time represents a waste of resources and a potential point of contention. Because resource 409 is occupied, vehicle 401 could travel to point 408 more slowly, thereby saving fuel and tire wear, for example, while still being equally productive.

Accordingly, because a potential contention has been identified, the present system determines a minimum acceptable speed profile selected to avoid the potential contention (see, for example, step 322 of FIG. 3A). In this example, the minimum acceptable speed profile is illustrated by curve 416. The minimum acceptable speed profile 416 can be created by delaying the maximum speed profile in order to avoid the potential contention. Here, the delay is equal to the period of time between times $t_1$ and $t_2$. If the maximum speed profile were to be delayed any further, there would be productivity losses, as that would represent resource 409 sitting idle for a period of time.

With the maximum speed profile 410 and the minimum acceptable speed profile 416 defined, an optimized speed profile can be determined. The optimized speed profile, for example, may allow vehicle 401 to arrive at resource 409 at the time the resource becomes available (i.e., at time $t_2$), while driving less aggressively and consuming fewer resources (e.g., fuel and tires) than under the minimum acceptable speed profile. A number of candidate optimized speed profiles, therefore, can exist in the region 418 between maximum speed profile 410 and minimum acceptable speed profile 416 where each profile runs from point 402 at time $t_0$ to point 408 at time $t_2$. The optimized speed profile can be calculated, for example, in accordance with step 324 of FIG. 3A.

In this example, the optimized speed profile is represented by curve 420. The optimization may be performed using a scoring function that seeks to minimize cost per ton of material transported. The resulting optimized speed profile is, therefore, selected to save fuel and tire wear, while also meeting constraints that require the resource be fully utilized.

Figure 5A:
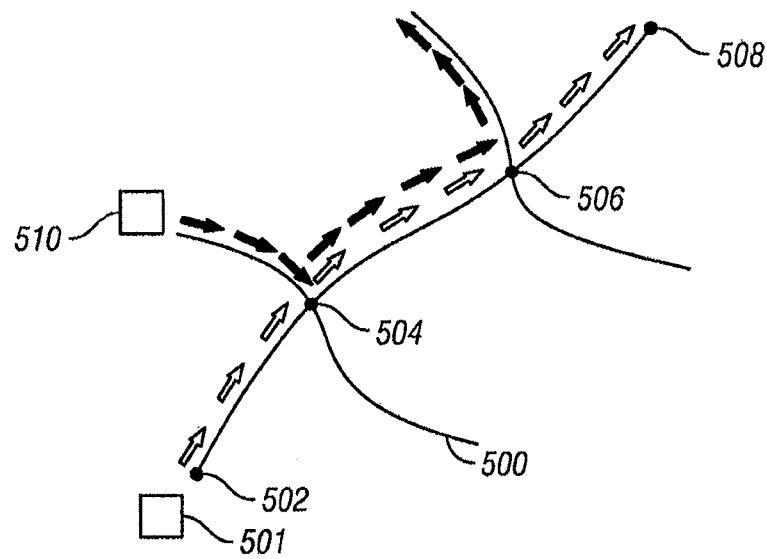
FIGS. 5A and 5B illustrate the determination of an optimized speed profile for a potential contention condition involving a slower second vehicle occupying a portion of a vehicle's assigned route.
Figure 5B:
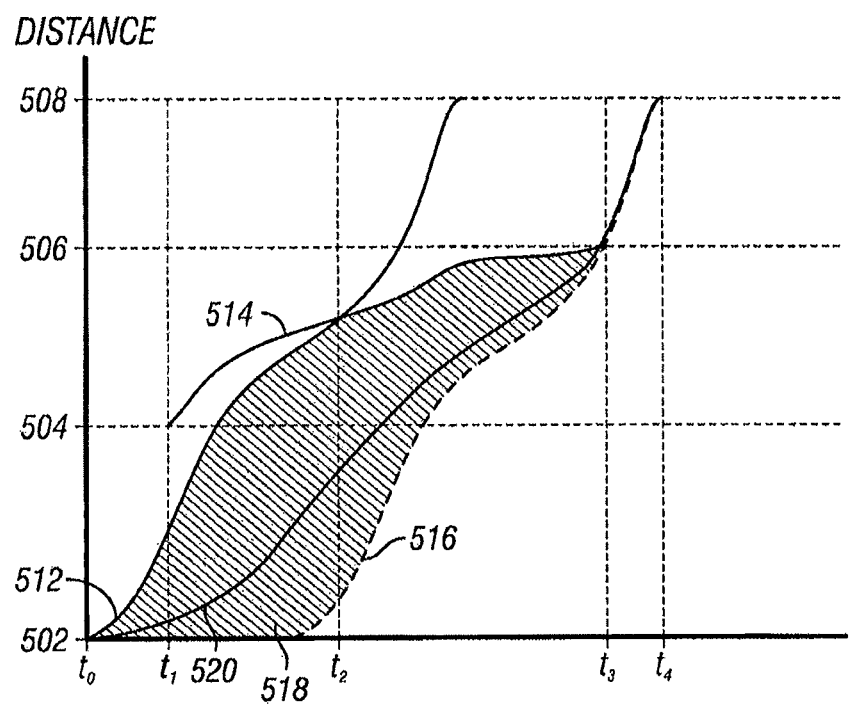

FIGS. 5A and 5B illustrate the determination of an optimized speed profile for a potential contention condition involving a slower second vehicle occupying a portion of a vehicle's assigned route. FIG. 5A shows road network 500 as it may exist within a mining environment. Road network 500 includes a number of intersections 504, 506. Vehicle 501, located at starting point 502, is assigned a route to drive through the road network 500 to reach a target destination. In this case, the target destination is located at point 508. Second vehicle 510 is also driving along network 500 and will travel between points 504 and 506. As such, for a period of time, second vehicle 510 will occupy a portion of the assigned route of vehicle 501.

FIG. 5B is a graph showing a number of speed profiles for different vehicles operating within the mining environment in which road network 500 is located. The y-axis of FIG. 5B represents a location along a route between point 502 and point 508. The x-axis represents time. FIG. 5B includes a number of speed profiles 512, 514, 516, and 520.

In this example, vehicle 501 has been assigned a route to travel from point 502 to the target destination at point 508.

The present system, therefore determines an optimized speed profile allowing the vehicle to reach the destination while minimizing potential contention.

In order to determine an optimized speed profile for the vehicle, the present system first determines a maximum speed profile for the vehicle to navigate along the assigned route (see, for example, step 318 of FIG. 3A). In FIG. 5B, the maximum speed profile is shown by curve 512. The maximum speed profile 512 presumes that the vehicle begins driving along the assigned route immediately (i.e., at time $t_0$) and proceeds along the assigned route at the vehicle's maximum speed.

Before the optimized speed profile can be generated for the vehicle, it is necessary to identify potential points of contention. In this example, vehicle 510 will occupy a portion of vehicle 501's route. Vehicle 510's anticipated speed profile is shown by curve 514, which shows vehicle 510 driving between point 504 and 506 on vehicle 501's assigned route. The movement of vehicle 510 can be determined by analyzing the movement of other vehicles within the mine environment (e.g., using data provided by fleet profiles database 314).

In this example, the movement of vehicle 510 is a potential contention point because the mine's traffic rules (defined, for example, in procedural constraints database 312) do not allow vehicles to overtake one another on the portion of the route running between points 504 and 506. Additionally, it is known (for example, in fleet profiles database 314) that vehicle 510 travels slower than an optimal speed of vehicle 501.

As shown in FIG. 5B, if vehicle 501 were to follow maximum speed profile 512, vehicle 501 would reach the vehicle 510 at time $t_2$ on the portion of the assigned route running between points 504 and 506. As a result, vehicle 501 would have to slow to a sub-optimal speed and follow vehicle 510 until vehicle 510 reaches point 506 and turns away from vehicle 501's assigned route.

As such, the anticipated presence of vehicle 510 represents a potential contention condition. Consequently, the present system determines a minimum acceptable speed profile selected to avoid the potential contention (see, for example, step 322 of FIG. 3A). In this example, the minimum acceptable speed profile is illustrated by curve 516. The minimum acceptable speed profile 516 can be created by delaying the maximum speed profile in order to avoid potential contention with vehicle 510.

With the maximum speed profile 512 and the minimum acceptable speed profile 516 defined, an optimized speed profile can be determined. The optimized speed profile would, for example, allow the vehicle to arrive at the target destination at the earliest possible time, while consuming fewer resources (e.g., fuel and tires) than under the minimum acceptable speed profile. A number of candidate optimized speed profiles can exist in the region 518 between maximum speed profile 512 and minimum acceptable speed profile 516 below profile 514. The optimized speed profile can be calculated, for example, in accordance with step 324 of FIG. 3A.

In this example, the optimized speed profile is represented by curve 520. The optimization may be performed using a scoring function that seeks to minimize cost per ton of material transported. The resulting optimized speed profile is, therefore, selected to save fuel and tire wear, while also meeting other constraints that may require the vehicle to meet certain productivity requirements. In this example, the portion of optimized speed profile 520 occurring after t3 (i.e., after the contention has been avoided) is substantially equal to the corresponding portion of the maximum speed profile. In other words, following the contention condition, the vehicle may simply resume traveling according to the maximum speed profile.

Figure 6A:
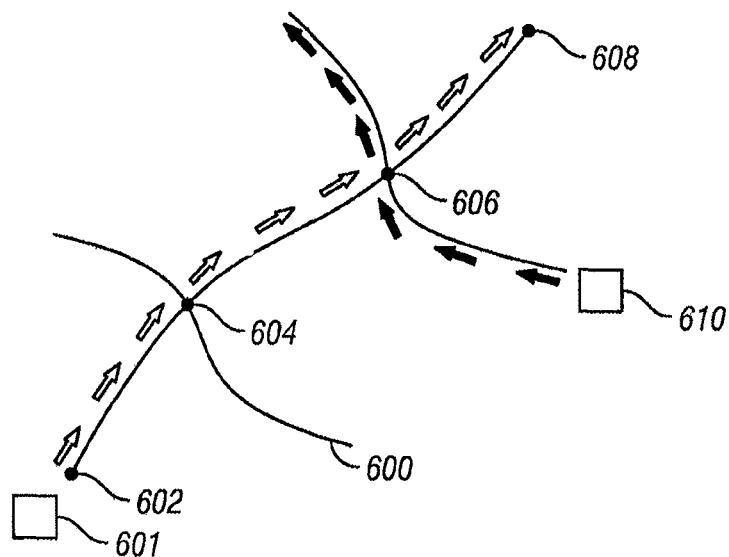
FIGS. 6A and 6B illustrate the determination of an optimized speed profile for a potential contention condition involving an intersection.
Figure 6B:
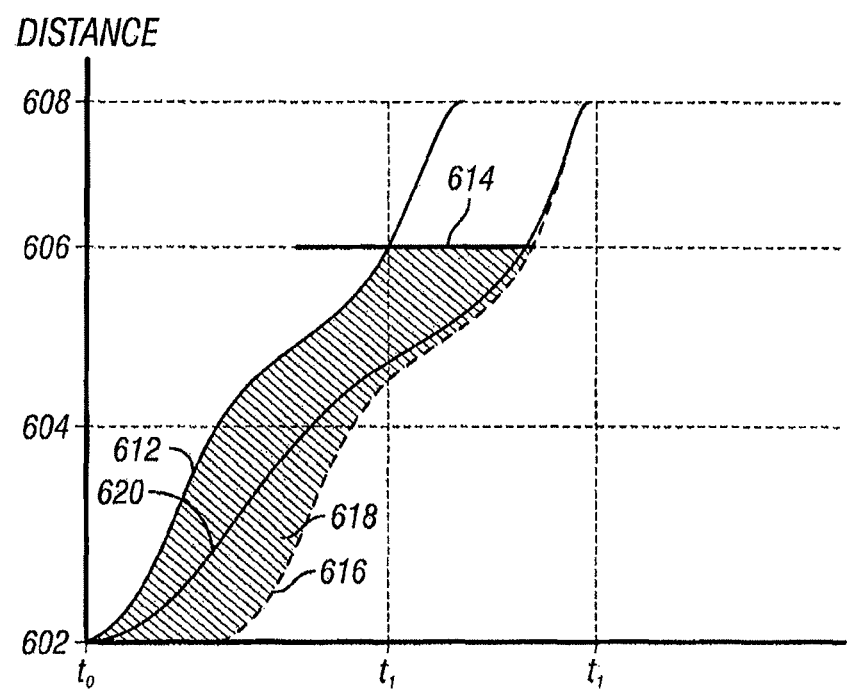

FIGS. 6A and 6B illustrate the determination of an optimized speed profile for a potential contention condition involving an intersection. FIG. 6A shows road network 600 as it may exist within a mining environment. Road network 600 includes a number of intersections 604, and 606. Vehicle 601, located at starting point 602, is assigned a route to drive through the road network 600 to reach a target destination. In this case, the target destination is located at point 608. Second vehicle 610 is also driving along network 600 and will travel through the intersection at point 606. As such, for a period of time, second vehicle 610 will occupy a portion of the assigned route of vehicle 601.

FIG. 6B is a graph showing a number of speed profiles for different vehicles operating within the mining environment in which road network 600 is located. The y-axis of FIG. 6B represents a location along a route between point 602 and point 608. The x-axis represents time. FIG. 6B includes a number of speed profiles 612, 614, 616, and 620.

In this example, vehicle 601 has been assigned a route to travel from point 602 to the target destination at point 608. The present system, therefore determines an optimized speed profile allowing the vehicle to reach the destination while minimizing potential contention.

In order to determine an optimized speed profile for the vehicle, the present system first determines a maximum speed profile for the vehicle to navigate along the assigned route (see, for example, step 318 of FIG. 3A). In FIG. 6B, the maximum speed profile is shown by curve 612. The maximum speed profile 612 presumes that the vehicle begins driving along the assigned route immediately (i.e., at time $t_0$) and proceeds along the assigned route at the vehicle's maximum speed.

Before the optimized speed profile can be generated for the vehicle, it is necessary to identify potential points of contention. In this example, vehicle 610 will pass through intersection 606. Vehicle 610's anticipated speed profile is shown by curve 614. In this example, curve 614 is a horizontal straight line that shows vehicle 610 occupy a single point (namely the intersection at point 606) along vehicle 601's assigned route. The anticipated movement of vehicle 610 (and, therefore, the period when vehicle 610 will occupy the intersection) can be determined by analyzing the movement of other vehicles within the mine environment (e.g., using data provided by fleet profiles database 314) in combination with the utilization (or anticipated utilization) of resources (e.g., using data provided by resource occupation database 316).

In this example, the presence of vehicle 610 in the intersection at point 606 is a potential contention point because the mine's traffic rules (defined, for example, in procedural constraints database 312) give vehicle 610 priority over vehicle 601 at intersections.

As shown in FIG. 6B, if vehicle 601 were to follow maximum speed profile 612, vehicle 601 would reach the vehicle 610 at the intersection at time $t_1$. As a result, vehicle 601 would have to slow to a sub-optimal speed or stop and wait until vehicle 610 has exited the intersection. Vehicle 601 would only then be able to accelerate and resume traveling along the assigned route.

As such, the anticipated presence of vehicle 610 in the intersection represents a potential contention condition. Consequently, the present system determines a minimum acceptable speed profile selected to avoid the potential contention (see, for example, step 322 of FIG. 3A). In this example, the minimum acceptable speed profile is illustrated by curve 616. The minimum acceptable speed profile 616 can be created by delaying the maximum speed profile in order to avoid potential contention with vehicle 610.

With the maximum speed profile 612 and the minimum acceptable speed profile 616 defined, an optimized speed profile can be determined. The optimized speed profile, for example, may allow the vehicle to arrive at the target destination at the earliest possible time, while consuming fewer resources (e.g., fuel and tires) than under the minimum acceptable speed profile. A number of candidate optimized speed profiles can exist in the region 618 between maximum speed profile 612 and minimum acceptable speed profile 616 and below speed profile 614. The optimized speed profile can be calculated, for example, in accordance with step 324 of FIG. 3A.

In this example, the optimized speed profile is represented by curve 620. The optimization may be performed using a scoring function that seeks to minimize cost per ton of material transported. The resulting optimized speed profile is, therefore, selected to save fuel and tire wear, while also meeting other constraints that may require the vehicle to meet certain productivity requirements.

Figure 7A:
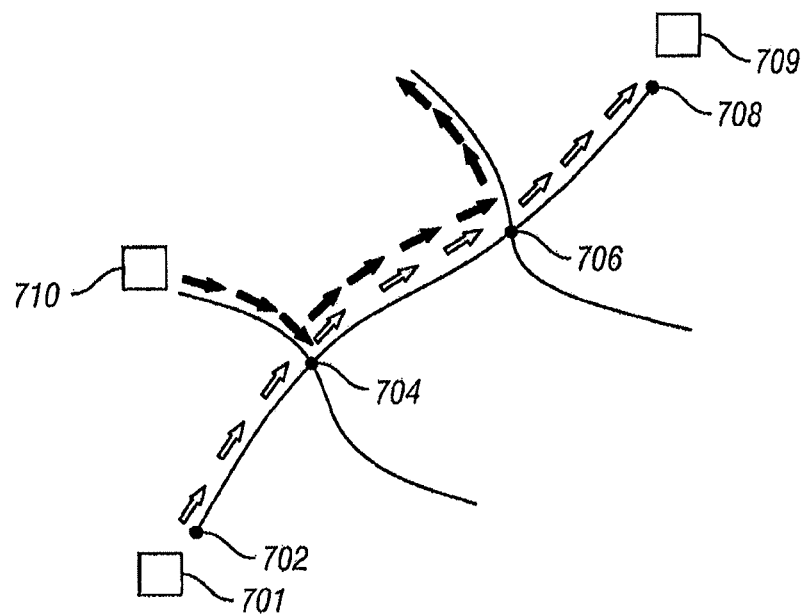
FIGS. 7A and 7B illustrate the determination of an optimized speed profile for a potential contention condition involving both an unavailable resource and a slower vehicle occupying a portion of an assigned route.
Figure 7B:
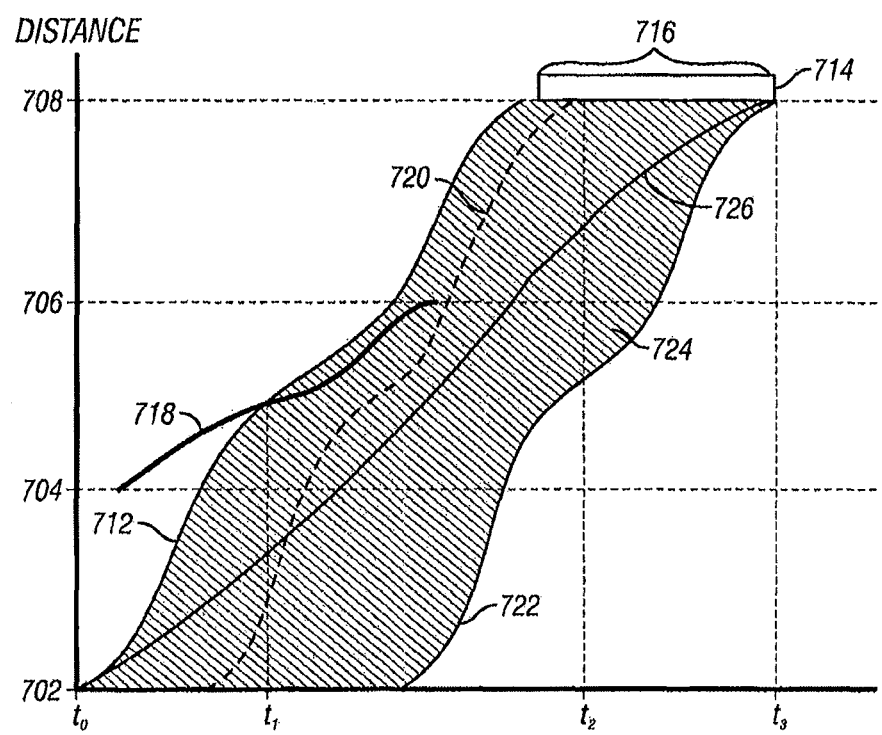

FIGS. 7A and 7B illustrate the determination of an optimized speed profile for a potential contention condition involving both an unavailable resource and a slower vehicle occupying a portion of an assigned route. FIG. 7A shows road network 700 as it may exist within a mining environment. Road network 700 includes a number of intersections 704, 706. Vehicle 701, located at starting point 702, is assigned a route to drive through the road network 700 to reach a target destination. In this case, the target destination is a resource 709 located at point 708. Resource 709 could be a dump site, a crusher, or a shovel. Resource 709 has limited capacity and may, in certain circumstances, be occupied by a number of other vehicles. Accordingly, resource 709 is a potential point of contention. Additionally, second vehicle 710 is also driving along network 700 and will travel between points 704 and 706. As such, for a period of time, second vehicle 710 will occupy a portion of the assigned route of vehicle 701 representing another potential point of contention.

FIG. 7B is a graph showing a number of speed profiles for different vehicles operating within the mining environment in which road network 700 is located. The y-axis of FIG. 7B represents a location along a route between point 702 and point 708. The x-axis represents time.

FIG. 7B includes a number of speed profiles 712, 718, 720, 722, and 726. Each speed profile represents the location of a particular vehicle at a given time. Because each speed profile curve maps vehicle location to time, the slope of the curves indicates the vehicle's speed at a particular location and time along a particular route. The speed profiles, therefore, can be used to determine how fast a particular vehicle should be traveling at a particular point along an assigned route in order to be operating in conformance with the speed profile.

In this example, vehicle 701 has been assigned a route to travel from point 702 to resource 709 located at point 708 in order to use resource 709 (e.g., a shovel). The present system, therefore determines an optimized speed profile allowing vehicle 701 to reach resource 709 while minimizing potential contention.

In order to determine an optimized speed profile for vehicle 701, the present system first determines a maximum speed profile for vehicle 701 to navigate along the assigned route (see, for example, step 318 of FIG. 3A). In FIG. 7B, the maximum speed profile is shown by curve 712. The maximum speed profile 712 presumes that vehicle 701 begins driving along the assigned route immediately (i.e., at time $t_0$) and proceeds along the assigned route at the vehicle's maximum speed. The maximum speed profile 712 can be determined by analyzing characteristics of the road network, such as grade, surface, and the like (stored, for example, in road network database 308), procedural constraints such as speed limits, passing restrictions, minimum following distances, priorities at intersections, and the like (stored, for example, in procedural constraints database 312), the vehicle dynamics such as maximum speed and acceleration under a number of operating conditions (stored, for example, in vehicle dynamics model database 310). In short, maximum speed profile 712 is the speed profile that would allow vehicle 701 to reach resource 709 in the shortest amount of time, assuming no contention.

Before the optimized speed profile can be generated for vehicle 701, therefore, it is necessary to identify potential points of contention along the assigned route of vehicle 701. In this example, resource 709 is anticipated to be occupied for a period of time, preventing vehicle 701 from using resource 709 immediately. The occupation of resource 709 is shown by block 714. During time period 716, resource 709 is unavailable to other vehicles. The occupation of resource 709 can be determined by analyzing the movement of other vehicles within the mine environment (e.g., using data provided by fleet profiles database 314) in combination with the utilization (or anticipated utilization) of resources (e.g., using data provided by resource occupation database 316).

Additionally, in this example, second vehicle 710 will occupy a portion of vehicle 701's route. Vehicle 710's anticipated speed profile is shown by curve 718, which shows vehicle 710 driving between point 704 and 706 on vehicle 701's assigned route. In this example, the movement of vehicle 510 is a potential contention point because the mine's traffic rules (defined, for example, in procedural constraints database 312) do not allow vehicles to overtake one another on the portion of the route running between points 704 and 706. Additionally, it is known (for example, in fleet profiles database 314) that vehicle 710 travels slower than an optimal speed of vehicle 701.

As shown in FIG. 7B, if vehicle 701 were to follow maximum speed profile 712, vehicle 701 would reach second vehicle 710 at time $t_1$ on the portion of the assigned route running between points 704 and 706. As a result, vehicle 701 would have to slow to a sub-optimal speed and follow vehicle 710 until vehicle 710 reaches point 706 and turns off vehicle 701's assigned route.

As such, the anticipated presence of vehicle 710 represents a potential contention condition. Consequently, the present system attempts to determine a minimum acceptable speed profile selected to avoid the potential contention (see, for example, step 322 of FIG. 3A). In this example, a first minimum acceptable speed profile is illustrated by curve 720. Speed profile 720 can be created by delaying the maximum speed profile in order to avoid potential contention with second vehicle 710.

However, in this example, if vehicle 701 were to adopt speed profile 720, although vehicle 701 would avoid contention with second vehicle 710, vehicle 701 would reach resource 709 while resource 709 is still occupied. As a result, vehicle 701 would have to wait for a period of time (from $t_2$ to $t_3$) before resource 709 can be utilized. This period of time represents a waste of resources and a potential point of contention. Because resource 709 is occupied, vehicle 701 could travel to point 708 more slowly, thereby saving fuel and tire wear, for example, but still being equally productive.

Accordingly, because a second potential contention condition has been identified, the present system determines the minimum acceptable speed profile selected to avoid both the potential contention conditions associated with vehicle 710 and resource 709 (see, for example, step 322 of FIG. 3A). In this example, the minimum acceptable speed profile is illustrated by curve 722. The minimum acceptable speed profile 722 can be created by delaying the maximum speed profile in order to avoid the potential contention conditions. Here, the delay is selected to be sufficient to avoid contention with second vehicle 710 as well as resource 709. If the maximum speed profile were to be delayed any further, there would be productivity losses, as that would represent resource 709 sitting idle for a period of time.

With the maximum speed profile 712 and the minimum acceptable speed profile 722 defined, an optimized speed profile can be determined. The optimized speed profile, for example, may allow vehicle 701 to arrive at resource 709 at the time the resource becomes available (i.e., at time $t_2$), while driving less aggressively and consuming fewer resources (e.g., fuel and tires) than under the minimum acceptable speed profile. A number of candidate optimized speed profiles can exist in the region 724 between maximum speed profile 712 and minimum acceptable speed profile 722 where the candidate profiles run from point 702 at time $t_0$ to point 708 at time $t_3$. The optimized speed profile can be calculated, for example, in accordance with step 324 of FIG. 3A.

In this example, the optimized speed profile is represented by curve 726. The optimization may be performed using a scoring function that seeks to minimize cost per ton of material transported. The resulting optimized speed profile is, therefore, selected to save fuel and tire wear, while also meeting constraints that require the resource be fully utilized.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blue-Ray Disk) and the like. In certain embodiments, the information storage medium comprises an electronic information storage medium, such as and without limitation, a PROM, EPROM, EEPROM, Flash PROM, compactflash, smartmedia, and the like. In certain embodiments, the information storage medium comprises a holographic information storage medium.

Reference is made throughout this specification to "signals." Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

While one or more embodiments of the present invention have been illustrated in detail, the skilled artisan will appreciate that modifications and adaptations to those embodiments may be made without departing from the scope of the present invention as set forth in the following claims.

We claim:

1. A method, comprising:
    analyzing target destinations of each of at least two vehicles to identify a potential contention condition between the at least two vehicles; and
    after identifying the potential contention condition between the at least two vehicles, at least one of:
        accessing a controller of a first vehicle of the at least two vehicles to control the first vehicle to avoid the potential contention condition, and
        communicating with a human machine interface in the first vehicle to display an instruction to an operator of the first vehicle to cause the first vehicle to avoid the potential contention condition.

2. The method of claim 1, including, after identifying the potential contention condition between the at least two vehicles, at least one of:
    accessing a controller of a second vehicle of the at least two vehicles to control the second vehicle to avoid the potential contention condition, and
    communicating with a human machine interface in the second vehicle to display an instruction to an operator of the second vehicle to cause the second vehicle to avoid the potential contention condition.

3. The method of claim 1, wherein analyzing the target destination of each of the at least two vehicles to identify the potential contention condition between the at least two vehicles includes determining a route for at least one of the at least two vehicles.

4. The method of claim 1, wherein at least one of the at least two vehicles is a haul truck.

5. The method of claim 1, where the potential contention condition is an occupied resource contention.

6. The method of claim 1, wherein the potential contention condition is a roadway contention or an occupied intersection.

7. The method of claim 1, wherein communicating with the human machine interface in the first vehicle to display the instruction to the operator of the first vehicle includes causing the human machine interface in the first vehicle to display a target speed using the human machine interface of the first vehicle.

8. A method, comprising:
    determining a target destination or task for a first vehicle in a mining environment;
    analyzing the target destination or task for the first vehicle to identify a potential contention condition involving the first vehicle; and
    after identifying the potential contention condition involving the first vehicle, at least one of:
        accessing a controller of the first vehicle to control the first vehicle to avoid the potential contention condition, and
        communicating with a human machine interface in the first vehicle to display an instruction to an operator of the first vehicle to cause the first vehicle to avoid the potential contention condition.

9. The method of claim 8, wherein analyzing the target destination or task of the first vehicle to identify the potential contention condition includes determining a route through the mining environment for the first vehicle.

10. The method of claim 8, wherein the first vehicle is a haul truck.

11. The method of claim 8, where the potential contention condition is an occupied resource contention.

12. The method of claim 8, wherein the potential contention condition is a roadway contention or an occupied intersection.

13. The method of claim 8, wherein communicating with the human machine interface in the first vehicle to display the instruction to the operator of the first vehicle includes causing the human machine interface in the first vehicle to display a target speed using the human machine interface of the first vehicle.

14. A system, comprising
    a fleet profile database to identify a target destination of at least two vehicles in a mining environment; and
    a dispatch system configured to:
        access the fleet profile database to determine the target destinations of each of the at least two vehicles,
        analyze the target destinations of each of the at least two vehicles to identify a potential contention condition between the at least two vehicles within the mining environment; and
        after identifying the potential contention condition between the at least two vehicles at least one of:
            access a controller of a first vehicle of the at least two vehicles to control the first vehicle to avoid the potential contention condition, and
            communicate with a human machine interface in the first vehicle to display an instruction to an operator of the first vehicle to cause the first vehicle to avoid the potential contention condition.

15. The system of claim 14, wherein the dispatch system is configured to:
    access a controller of a second vehicle of the at least two vehicles to control the second vehicle to avoid the potential contention condition, and
    communicate with a human machine interface in the second vehicle to display an instruction to an operator of the second vehicle to cause the second vehicle to avoid the potential contention condition.

16. The system of claim 14, wherein the dispatch system is configured to determine a route through the mining environment for at least one of the at least two vehicles.

17. The system of claim 14, wherein at least one of the at least two vehicles is a haul truck.

18. The system of claim 14, where the potential contention condition is an occupied resource contention.

19. The system of claim 14, wherein the potential contention condition is a roadway contention or an occupied intersection.

20. The system of claim 14, wherein the dispatch system is configured to cause the human machine interface in the first vehicle to display a target speed using the human machine interface of the first vehicle.

* * * * *